Patented Oct. 7, 1930

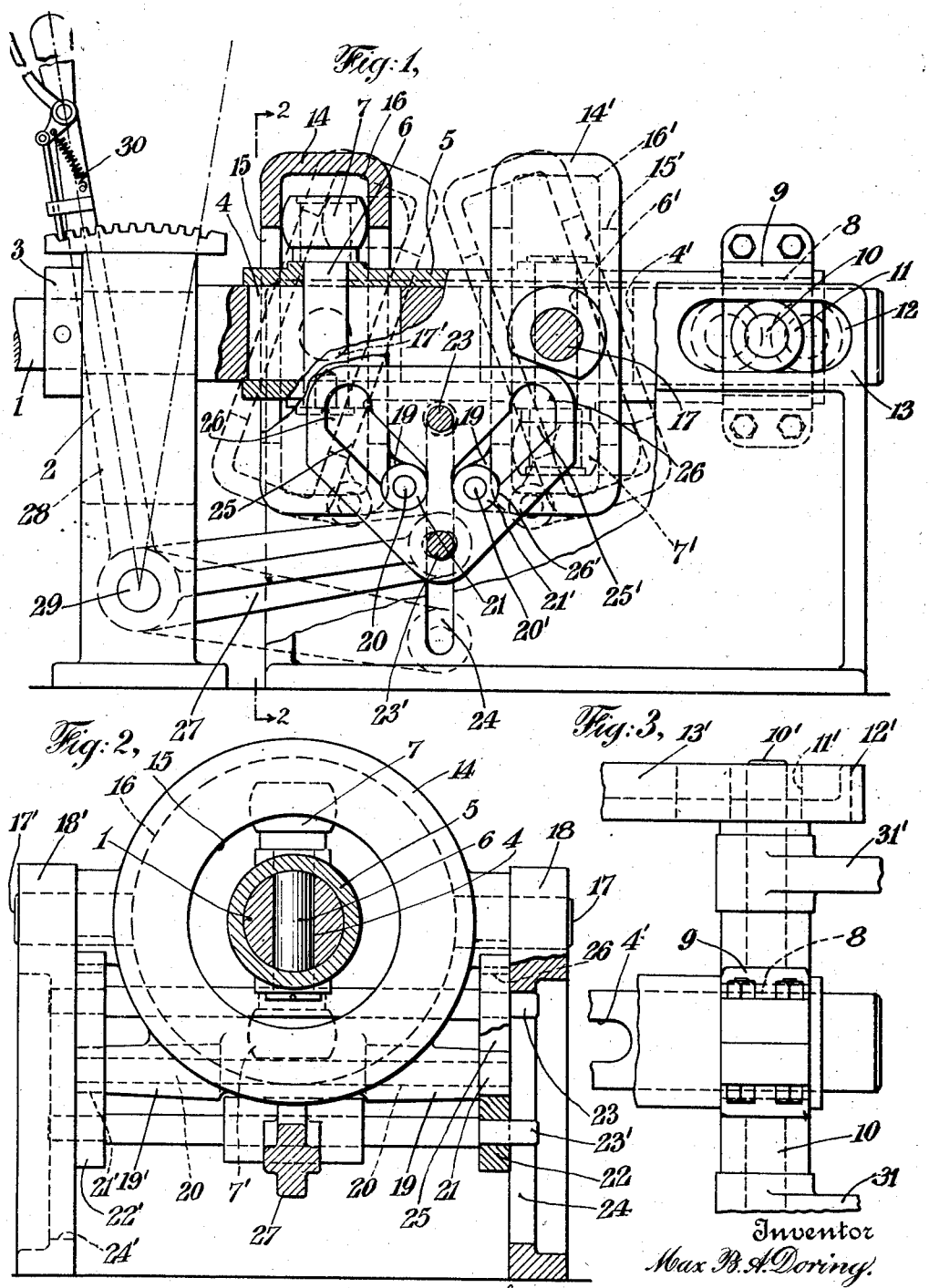

1,777,748

UNITED STATES PATENT OFFICE

MAX B. A. DORING, OF BROOKLYN, NEW YORK, ASSIGNOR TO DORING COMPANY, INC., OF NEW YORK, N. Y., A CORPORATION OF NEW YORK

MECHANICAL MOVEMENT

Application filed March 28, 1929. Serial No. 350,469.

This invention relates to improvements in mechanical movements and more particularly to power transmitting mechanism, and the principal object thereof is the provision of efficient means of transmitting power whereby the driven shaft may be driven at various speeds and readily controlled without disconnecting or disengaging any parts of the mechanism itself nor requiring the medium of a clutch or other similar device. All gears are dispensed with and the control of the speeds and the direction of rotation of the driven shaft is accurate and complete in each direction. Any change of speed and power may be accomplished when the driving shaft is running either at high or low speed.

A further object of this invention is the provision of means for transforming rotary motion into reciprocating motion without disconnecting any parts of the device or without utilizing a clutch; the stroke of the reciprocating motion may be changed from a minimum (zero) to its maximum without changing the speed of the rotating or driving member and at the same time the speed of the rotating member may be increased or decreased.

Further objects of this invention include improvements in details of construction and arrangement whereby an efficient and simple mechanism of this character is provided.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof, and which show merely for the purpose of illustrative disclosure a preferred embodiment of my invention, it being expressly understood, however, that various changes may be made in practice within the scope of the claims without digressing from my inventive idea.

In the drawings—

Figure 1 represents a side elevation partly in section of a device constructed to embody my invention (this showing is more or less diagrammatic), the parts being shown in full lines in neutral or zero position and in dotted lines in the extreme adjusted positions.

Figure 2 is a vertical cross section taken substantially on line 2—2 of Figure 1 looking in the direction of the arrows, parts being shown broken away.

Figure 3 is a fragmentary top plan view of parts of the rear end of the device.

At the outset it is to be understood that this invention is disclosed more or less diagrammatically in the drawings. The numeral 1 designates the driving shaft which may be driven or rotated by any suitable means. It is supported by a bearing 2 and prevented from longitudinal movement by the engagement of the bearing with the collar 3 secured to the shaft. This shaft is provided with a pair of slots 4 and 4' extending vertically therethrough and arranged in longitudinal alignment spaced apart. Mounted on the shaft 1 is an elongated sleeve member 5 through which short shafts or studs 6 and 6' are diametrically passed. The roller bearing member 7 is mounted upon the end of shaft 6 and roller bearing member 7' is mounted upon the end of shaft 6' and disposed on the opposite side of the shaft 1 and sleeve 5. The rotation of the shaft 1 causes rotation of the sleeve 5 because the sleeve is keyed to the shaft 1 by means of the short shafts or studs 6 and 6'. It is to be noted that the slots 4 and 4' are elongated so as to permit a longitudinal movement of said sleeve with relation to the shaft 1 regardless of whether the shaft is rotating or not.

The rear end of said sleeve 5 is provided with an annular external groove or recess 8 in which is mounted a ring or annulus 9, the fit being sufficiently loose to allow the sleeve to rotate freely within the ring. This ring 9 is provided with studs 10 and 10' extending from opposite sides thereof. Each stud has a roller 11, 11' mounted on the end thereof, which roller is positioned within and engages the sides of the elongated slots 12 and 12' formed in the side members 13 and 13' of the frame. This construction forms the support for the rear end of the driving shaft 1.

A pair of wheels or rings 14 and 14' are positioned about said sleeve 5 and shaft 1 and provided with enlarged central openings 15 and 15' so as to provide space between the wheels or rings 14 and the sleeve 5. These wheels or rings are preferably of channel shape in cross section, as indicated at 16 and 16' so as to receive and bear against the sides of the roller members 7 and 7'. The channel is of sufficient depth to permit relative movement between the roller members and the rings or wheels, as indicated in dotted lines.

These rings or wheels are pivotally supported on the side members 13 and 13' of the frame by having studs or projections 17 and 17' extending laterally therefrom, which studs have suitable bearings 18 and 18' in the side frames. This construction prevents the wheels or rings 14 and 14' from rotating on their own axes but permits them to swing or be swung on the axis of the studs 17 and 17' from a perpendicular position to an angular position and vice versa. When the rings or wheels 14 and 14' are in the perpendicular position, the sleeve 5 is rotated freely without any longitudinal or reciprocating movement, but when these rings or wheels 14 and 14' are moved or tilted to an angular position, the sleeve 5 will be moved back and forth longitudinally of itself or reciprocated due to the travel of the roller members 7 and 7' in the angular path formed by the channels of the wheels or rings 14 and 14'.

I provide lugs or extensions 19 and 19' extending laterally from the lower portion of each of said wheels or rings 14 and 14' and these lugs or extensions are bored to receive the supporting shafts 20 and 20' which extend therethrough. These shafts have roller members 21 mounted upon each end. On each side of the frame and within the side members 13 and 13' thereof I provide cam plates 22 and 22', these cam plates being connected together by means of shafts 23 and 23'. The outer ends of these shafts extend beyond the outer face of the cam plates into vertical slots 24, 24' formed in the side frame members 13 and 13'. Each cam plate is provided with a pair of inclined slots 25 and 25', which slots receive the rollers 21 and 21' on the shafts 20 and 20'. These inclined slots are provided with rounded portions or dwells 26 and 26' at each end in which said rollers rest and are locked at the extreme end of their movement in said slots.

These cam plates are moved up and down by means of the arm 27 and a bell crank operating lever 28 which is pivoted to the frame as at 29 and has the handle and dog and ratchet construction 30. As this handle is moved, the cam plates will be moved vertically up and down, causing movement of the rollers 21 and shafts 20 and 20' due to their engagement with the sides of slots 25 and 25'. As the rings or wheels 14 and 14' are connected to said shafts 20 and 20', these rings or wheels 14—14' will be moved or tilted or turned upon their pivots 17 and 17' according to the amount of movement given the shafts 20 and 20' by the movement of the cam plates 22—22'. The angular adjustment of the rings or wheels 14 and 14' determines the amount of longitudinal movement given to each roller 7—7' and its shaft 6—6' and, consequently, the sleeve 5 for each rotation of the parts. This longitudinal reciprocating movement is transmitted through the ring 9, shafts 10 to link or other connecting members 31—31' which may be connected in any suitable manner with any mechanism designed to utilize oscillating or reciprocating movement.

It is seen, therefore, that I have provided a mechanism which dispenses with gears and springs and in which the control and operation are all positive and in which adequate provision is made for adjustment as to speed and length of stroke regardless of speed of the driving shaft.

The roller members 7 and 7' constitute bearing members as they engage the sides of the channels formed in the inside of the ring members 14 and 14', which, therefore, constitute abutment members against which the bearing members bear during their travel in rotating with the shaft and sleeve.

What I claim is:—

1. A mechanical movement including in combination, a driving shaft, a sleeve mounted thereon and slidably keyed thereto, a bearing member connected to said sleeve and adapted to rotate with said sleeve and said shaft, a ring constituting the member against which said bearing member bears, said ring being mounted against rotation with said sleeve and shaft but mounted for pivotal movement to and from a vertical position so that the engagement of said bearing member therewith causes reciprocating motion of said sleeve, and means for moving and holding said ring in its adjusted positions.

2. In combination in a mechanical movement, a driving shaft, a sleeve mounted thereon and slidably keyed thereto, a pair of ring members pivotally mounted on a horizontal axis for moving to and from a vertical position relative to said shaft and sleeve, bearing members connected to said sleeve and adapted to engage said ring members, means for moving and holding said ring members in various adjusted positions so as to cause reciprocation of said sleeve when the shaft is rotated due to the engagement of said bearing members with said ring members.

3. In combination in a mechanical movement, a driving shaft, a sleeve mounted thereon and slidably keyed thereto, a pair of ring members pivotally mounted on a horizontal axis for moving to and from a vertical position relative to said shaft and sleeve, bearing members connected to said sleeve and adapted to engage said ring members, means for moving and holding said ring members in various adjusted positions so as to cause reciprocation of said sleeve when the shaft is rotated due to the engagement of said bearing members with said ring members, said last-mentioned means including a cam plate having an inclined slot therein, one of said ring members being provided with means engaging said inclined slot, and means for raising and lowering said cam plate whereby one of the ring members is caused to turn on its horizontal pivot.

4. In combination in a mechanical movement, a driving shaft, a sleeve mounted thereon and slidably keyed thereto, a pair of ring members pivotally mounted on a horizontal axis for moving to and from a vertical position relative to said shaft and sleeve, bearing members connected to said sleeve and adapted to engage said ring members, means for moving and holding said ring members in various adjusted positions so as to cause reciprocation of said sleeve when the shaft is rotated due to the engagement of said bearing members with said ring members, said bearing members being positioned on opposite sides of said shaft and sleeve.

5. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member.

6. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member, said abutment member being in the form of a ring formed with an internal channel within which said bearing member fits.

7. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member, including a cam plate having an inclined slot, means connected to said abutment member and engaging the sides of said slot and means for raising and lowering said cam plate.

8. In combination in a mechanical movement, a rotary driving member, a driven member mounted upon said driving member so as to rotate therewith but having a slidable connection so as to permit longitudinal movement with respect to said driving member, a plurality of bearing members connected to said driven member, a plurality of abutment members mounted against rotation with said driving and driven members but capable of independent adjustment relative thereto, said bearing members having engagement with said abutment members and means for moving and adjusting said abutment members to an inclined position so that when the driving and driven members are rotated, said driven member will also be reciprocated due to the engagement of the bearing members with the abutment members.

9. In combination in a mechanical movement, a rotary driving member, a driven member mounted upon said driving member so as to rotate therewith but having a slidable connection so as to permit longitudinal movement with respect to said driving member, a plurality of bearing members connected to said driven member, a plurality of abutment members mounted against rotation with said driving and driven members but capable of independent adjustment relative thereto, said bearing members having engagement with said abutment members and means for moving and adjusting said abutment members to an inclined position so that when the driving and driven members are rotated, said driven member will also be reciprocated due to the engagement of the bearing members with the abutment members, said abutment members being in the form of rings having internal channels within which said bearing members fit.

10. In combination in a mechanical movement, a rotary driving member, a driven member mounted upon said driving member so as to rotate therewith but having a slidable connection so as to permit longitudinal movement with respect to said driving member, a plurality of bearing members connected to said driven member, a plurality of abutment members mounted against rotation with said driving and driven members but capable of independent adjustment relative thereto, said bearing members having engagement with said abutment members and means for moving and adjusting said abutment members to an inclined position so that when the driving and driven members are rotated, said driven member will also be reciprocated due to the engagement of the bearing members with the abutment members, said moving and adjusting means including a pair of cam plates, each having a plurality of inclined slots formed therein, means connected to said abutment members and engaging in said inclined slots and means for moving said cam plate.

11. A mechanical movement including, in combination, a rotary driving member, an elongated sleeve mounted thereon so as to rotate therewith and at the same time be capable of reciprocating motion longitudinally of itself, said driving member being provided with a plurality of elongated slots therethrough, a short shaft or stud positioned in each slot and secured to said sleeve, each shaft having a bearing member on the end thereof, a plurality of abutment members, one for each bearing member, mounted against rotary movement with said shaft and sleeve but pivotally mounted so as to have an independent adjustment, and means for adjusting said abutment members.

12. A mechanical movement including, in combination, a rotary driving member, an elongated sleeve mounted thereon so as to rotate therewith and at the same time be capable of reciprocating motion longitudinally of itself, said driving member being provided with a plurality of elongated slots therethrough, a short shaft or stud positioned in each slot and secured to said sleeve, each shaft having a bearing member on the end thereof, a plurality of abutment members one for each bearing member mounted against rotary movement with said shaft and sleeve but pivotally mounted so as to have an independent adjustment, and means for adjusting said abutment members, said abutment members being in the form of rings having internal channels with the sides of which said bearing members engage.

13. A mechanical movement including, in combination, a rotary driving member, an elongated sleeve mounted thereon so as to rotate therewith and at the same time be capable of reciprocating motion longitudinally of itself, said driving member being provided with a plurality of elongated slots therethrough, a short shaft or stud positioned in each slot and secured to said sleeve, each shaft having a bearing member on the end thereof, a plurality of abutment members, one for each bearing member, mounted against rotary movement with said shaft and sleeve but pivotally mounted so as to have an independent adjustment, and means for adjusting said abutment members, said adjusting means including a lever, a pair of cam plates connected to said lever so as to be raised and lowered thereby, said cam plates being provided with a plurality of inclined slots and said abutment members being provided with means engaging said inclined slots so that when the cam plates are raised and lowered, said abutment members will be swung on their pivots.

14. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member, and connections with said driven member for transmitting the reciprocating motion thereof.

15. A mechanical movement including, in combination, a rotary driving member, an elongated sleeve mounted thereon so as to rotate therewith and at the same time be capable of reciprocating motion longitudinally of itself, said driving member being provided with a plurality of elongated slots therethrough, a short shaft or stud positioned in each slot and secured to said sleeve, each shaft having a bearing member on the end thereof, a plurality of abutment members, one for each bearing member, mounted against rotary movement with said shaft and sleeve but pivotally mounted so as to have an independent adjustment, and means for adjusting said abutment members, said elongated sleeve having a ring secured thereto, studs connected to said ring and slidably supported at their ends and transmitting means connected to said studs.

16. In combination in a mechanical movement, a driving member mounted for rotation, a driven member connected to said driving member to rotate therewith but being capable of independent longitudinal movement with respect thereto, bearing members connected to said driven member, abutment members with which said bearing members engage, said abutment members being pivotally mounted so as to be normally held in a plane at right angles to the axis of the driving member, means for moving said abutment members to planes at an acute angle to the axis of said driving member.

17. In combination in a mechanical movement, a driving member, a driven member mounted to rotate therewith but free to move longitudinally with respect thereto, a bearing member connected to said driven member, an abutment member pivoted on an axis transverse to the axis of said driving member, said abutment member including a channel within which said bearing member fits, said abutment member being normally in a plane at right angles to the plane of said driving member and means for moving said abutment member on its pivot to a plane at an acute angle to the axis of said driving member.

18. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member, including a cam plate having an inclined slot, said slot having rounded portions of dwells at the ends thereof for locking said cam plate in its extreme positions, means connected to said abutment member and engaging the sides of said slot and means for raising and lowering said cam plate.

19. In combination in a mechanical movement, a rotary driving member, a driven member mounted upon said driving member so as to rotate therewith but having a slidable connection so as to permit longitudinal movement with respect to said driving member, a plurality of bearing members connected to said driven member, a plurality of abutment members mounted against rotation with said driving and driven members but capable of independent adjustment relative thereto, said bearing members having engagement with said abutment members and means for moving and adjusting said abutment members to an inclined position so that when the driving and driven members are rotated, said driving member will also be reciprocated due to the engagement of the bearing members with the abutment members, said moving and adjusting means including a pair of cam plates, each having a plurality of inclined slots formed therein, each of said slots having rounded portions or dwells at the ends thereof for locking said cam plates in their extreme positions, means connected to said abutment members and engaging in said inclined slots and means for moving said cam plates.

20. In combination in a mechanical movement, a rotary driving member, a driven member slidably keyed to said driving member so as to rotate therewith and also capable of being reciprocated thereon, a bearing member connected to said driven member, an abutment member with which said bearing member engages, said abutment member being adjustable to and from a vertical position so as to cause reciprocation of the driven member when the driving member is rotated, and means for moving and adjusting said abutment member, including a cam plate having an inclined slot, means connected to said abutment member and including a roller engaging the sides of said slot and means for raising and lowering said cam plate.

In testimony that I claim the foregoing, I have hereunto set my hand this 26th day of March, 1929.

MAX B. A. DORING.

CERTIFICATE OF CORRECTION.

Patent No. 1,777,748. Granted October 7, 1930, to

MAX B. A. DORING.

It is hereby certified that error appears in the printed specification of the above numbered patent requiring correction as follows: Page 5, line 15, claim 18, for the word "of" read or; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.